Patented July 25, 1944

2,354,218

UNITED STATES PATENT OFFICE 2,354,218

OPERATION AND LUBRICATION OF MECHANICAL APPARATUS

William S. Murray, Utica, N. Y., assignor to Indium Corporation of America, a corporation of New York No Drawing. Application June 3, 1940,
Serial No. 338,583

14 Claims. (Cl. 252—35)

This invention relates to the operation of mechanical apparatus including relatively moving, substantially contacting parts, such, for example, as internal combustion engines including pistons mounted within cylinders and moving relatively thereto, and including also shafts rotating in bearings. More particularly the invention relates to improved lubricants and fuels containing indium and indium compounds for use in the operation of such apparatus, and has for its principal object the provision of improved lubricants and fuels containing indium in suitable forms.

Apparatus such as internal combustion engines, including, relatively moving substantially contacting parts, such as pistons reciprocating in cylinders and shafts rotating in bearings, are, of course, well known to require lubrication for their successful operation. Lubricants, such, for example, as oils of mineral or vegetable origin, employed in such apparatus are subjected to high pressures and elevated temperatures, and under such conditions are susceptible to deterioration. For example, sludges tend to form in the lubricants, presumably owing to oxidation, polymerization, or other causes or combinations of causes. Sludges are objectionable for the reason that they reduce the lubricating qualities of the oil or other lubricant and often cause sticking of relatively moving parts. Furthermore, organic acids tend to form in oils or other lubricants during use thereof, apparently because of oxidation of the oil at the elevated temperatures to which it is exposed. Organic acids are objectionable for the reason that they cause corrosion of various parts, particularly the bearings, of the apparatus in which the oil containing them is used.

Numerous attempts have been made to overcome these difficulties. For example, lubricating oils have been treated with various compounds, such as organic compounds of calcium and tin, in order to increase resistance of the lubricant to sludge formation. In the case of internal combustion engines, the cylinders have been coated with tin in order to resist corrosion and to minimize the tendency for oils containing sludges to cause sticking between the cylinders and pistons. Various attempts have been made also to produce bearings resistant to the corrosive influence of organic acids forming in the lubricating oils during operation of the engine or other apparatus. Bearings having a surface coating of indium or having a surface layer into which indium is diffused have been successfully made and found to resist such corrosion, but it has been necessary heretofore to apply the indium to the bearings before installation of the bearing in the engine.

I have found that by providing lubricants and fuels containing indium in various forms, and employing such lubricants and fuels in the operation of the engine, it is possible to minimize the foregoing detrimental effects. The use in such apparatus of fuels and lubricants according to the invention may be made to serve any one or more of a number of useful purposes. Thus, apparatus including relatively moving substantially contacting parts, such as an internal combustion engine, may be operated in the presence of a fluid containing a substance comprising indium under such conditions that the fluid comes in contact with at least one of the relatively moving parts and metallic indium is caused to be deposited thereon. The fluid may, for example, be a lubricant such as a lubricating oil containing a substance comprising indium. Such a lubricant may be employed with advantage in apparatus including relatively moving substantially contacting parts, where at least one of such parts is non-ferrous, such, for example, as a ferrous shaft operating in a non-ferrous bearing. Such apparatus may be operated in the presence of a lubricant according to the invention under conditions such that metallic indium is caused to deposit on the non-ferrous bearing, thus imparting to the bearing a metallic surface film which does not impair the serviceability of the bearing in any respect, and yet increases its resistance to corrosion by acids which might form in the lubricant.

For this purpose I prefer to employ a lubricant comprising a lubricating oil and containing a substance comprising indium, said substance being of such character that during operation of the apparatus metallic indium appears in a form amenable to deposition on and adherence to the non-ferrous part. A lubricant containing metallic indium in colloidal form may be employed for this purpose, or advantageously a lubricant comprising a lubricating oil and containing an unstable compound of indium capable of decomposing under the influence of heat and pressure with the liberation of metallic indium may be employed. In the latter category, a lubricant comprising a lubricating oil and containing an unstable indium organic compound, such as indium trimethyl or indium triethyl, may be used advantageously.

In the case of internal combustion engines including a piston reciprocating within a cylinder, a fuel may be employed comprising a combustible fluid and a substance comprising indium, and the engine may be operated with such fuel in a manner to cause deposition of metallic indium on the surface of either the cylinder or the piston, or both. In this connection it is to be noted that metallic indium does not adhere readily to ferrous surfaces, but can be made without particular difficulty to adhere to non-ferrous surfaces. Since generally internal combustion engine cylinders are ferrous, the indium will not adhere directly thereto, but if the cylinders are tin-coated the engine can be operated in a manner to cause deposition of metallic indium on the tin-coated surface, resulting in protection of the cylinder walls against corrosion. For this purpose the engine may be operated with a fuel comprising a combustible liquid and containing a substance comprising indium, preferably a substance capable of decomposing under the influence of heat and pressure, with resulting appearance in the cylinder of metallic indium in a form amenable to deposition on the cylinder or piston. For this purpose a fuel containing a volatile indium organic compound amenable to decomposition in the manner indicated, may be employed effectively, such, for example, as a gasoline containing indium trimethyl or indium triethyl.

In the operation of two-cycle engines, it is common to employ a combination fuel and lubricant. In accordance with the present invention such engines advantageously are operated with a combination fuel and lubricant comprising a combustible liquid such as gasoline, a lubricant such as a mineral or vegetable oil, and a substance comprising indium, preferably a volatile indium compound of the character indicated above.

A further and important embodiment of the invention hinges upon the ability of indium in certain forms to inhibit sludge formation in lubricants such as lubricating oils, or to neutralize acids tending to form in such oils during use in apparatus such as internal combustion engines, or in some cases to accomplish both of these results. The invention thus contemplates the provision of a lubricant comprising a lubricating oil and containing an indium-bearing substance capable of inhibiting formation in said oil of sludges and of products which are corrosive to metallic surfaces. Indium in various forms may be employed in this connection. Thus, indium in oxidizable form, such, for example, as colloidal metallic indium, or oil-soluble or oil-dispersible oxidizable indium compounds, may be employed. A lubricant comprising a lubricating oil and containing an indium aromatic stearate is particularly useful for its ability to resist formation of sludges or corrosive substances, or both.

In this connection it may be noted that various metal aromatic stearates have been employed for the purpose of inhibiting sludge formation in lubricating oils. Stannous phenyl stearate has been used, for example, but in some cases has been found to be undesirable because of the liberation of metallic tin. When the tin thus liberated deposits on the surfaces of bearings having a cadmium base, such as are commonly used in internal combustion engines, it makes the bearing susceptible to cracking. Indium does not possess this undesirable characteristic. In fact, any indium liberated from the indium aromatic stearate during use of the oil in the engine not only will not adversely affect the mechanical or metallurgical properties of the bearing on which it deposits, but will enhance the corrosion resistance of the bearing without impairing its mechanical properties.

Again it is possible to employ a lubricant comprising a lubricating oil and containing an indium-bearing substance capable of neutralizing organic acids tending to form in the oil and which are corrosive to metallic surfaces. A lubricant comprising a lubricating oil and containing indium in a form capable of reacting with and neutralizing an acid may be employed for this purpose. Such a lubricant may be composed of a lubricating oil and a basic indium compound, such as indium hydroxide or a basic indium organic compound. The presence of an indium compound of this character in the oil may lead to the formation of indium organic compounds with the oil or with acids or other oxidation products formed in the oil during its use. The presence of indium organic compounds thus formed may further enhance the quality of the oil by increasing its resistance to sludge formation, or by presenting indium compounds of such character that metallic indium is liberated from them as the lubricant is subjected to heat and pressure between the bearing and the shaft rotating therein, and the metallic indium thus liberated may deposit on the bearing surfaces.

The following examples illustrate various specific embodiments of the invention:

EXAMPLE A

*Lubricating oil containing an unstable indium compound*

Indium trimethyl is prepared in any suitable manner, such, for example, as by the procedure described by Dennis, Work and Rochow in Journal of the American Chemical Society, vol. 56 (1934), pages 1047 and 1048. This procedure involves reacting metallic indium with mercury dimethyl in the presence of a small amount of mercuric chloride. Indium trimethyl thus prepared, or prepared in any other suitable manner, is added to a lubricating oil, such, for example, as a lubricating oil of petroleum origin having a viscosity of the order of 60 seconds Saybolt Universal at 100° F.

The indium trimethyl is sufficiently soluble in the petroleum lubricating oils so that the amount required may be dissolved without particular difficulty. The amount of indium trimethyl required is not large. For most purposes one part by weight of indium trimethyl per hundred parts by weight of the lubricating oil is adequate. In general the amount of indium trimethyl incorporated in the oil will be in the range of $\frac{1}{10}$ part to 5 parts by weight per 100 parts by weight of oil. The indium trimethyl should not be heated very much above room temperature during dissolution in the oil, and the oil itself should be substantially water-free or the indium trimethyl is likely to decompose.

The lubricant thus prepared is introduced into the crank case of an internal combustion engine or other oil reservoir of apparatus to be lubricated. During operation of the apparatus, the lubricant becomes heated and subjected to considerable pressure, particularly that portion of the lubricant forming a film between relatively moving substantially contacting surfaces, such as a shaft rotating in a bearing. In consequence of this elevated temperature and pressure, and particularly if any small amount of moisture is present, the indium trimethyl decomposes with the liberation of metallic indium. The metallic indium thus liberated adheres readily to non-ferrous surfaces, such as bearing surfaces, forming a protective film of indium thereon. Under continued operation of the apparatus, indium thus deposited diffuses into the surface layer of the bearing metal, thus alloying itself permanently with the bearing.

Decomposition of the indium trimethyl also results in the production of a small amount of methane gas, some of which may dissolve in the lubricant and some of which may escape.

In place of an oil containing indium trimethyl, other unstable indium compounds, such, for example, as indium triethyl, may be employed. The preparation of indium triethyl is similar to that of indium trimethyl, except, of course, that different starting compounds are employed (in the case of the preparation described by Dennis et al. in Journal of the American Chemical Society, supra, mercury diethyl would be employed as a starting material in place of mercury dimethyl).

Lubricants prepared as described above may be used regularly in internal combustion engines and kindred apparatus requiring lubrication, but often it is sufficient to employ lubricants prepared in accordance with the invention only for a short period of time, preferably during the so-called breaking-in period of new engines or other apparatus. During this period a sufficient protective film of indium may be deposited on the bearing surfaces and other non-ferrous parts requiring protection to suffice for the normal life of such parts. Regular use of the improved lubricant in such apparatus, however, is not detrimental. The indium alloying, for example, with a cadmium-base bearing surface does not in any way impair the mechanical properties of such a surface, but it does materially enhance its resistance to corrosion. In both of these respects it is superior to compounds such as tin compounds which, when used in oil, tend to decompose and deposit on the bearing surface, resulting in a bearing such as is subject to cracking and which is not particularly resistant to corrosion by acids or other oxidation products forming in the lubricating oil during use thereof.

Although partcular reference is made in the foregoing example to the use of mineral oil lubricants, it is understood that improved lubricants according to the invention may be prepared using oils of different origins, and other equivalent materials, as the base of the composition. For example, well-known lubricating oils of vegetable origin, such, for example, as castor oil may be employed, or the indium compound may be incorporated in a lubricating grease of any conventional composition.

EXAMPLE B

Lubricating oil containing colloidal indium

Colloidal indium is prepared in any suitable manner. For example, colloidal indium in a benzene vehicle may be prepared by introducing particles of commercial metallic indium into a vessel containing benzene and producing a vigorous spark discharge between terminals positioned in the vessel below the surface of the benzene and in close proximity to the metallic indium therein. After a short period of time a substantial proportion of the metallic indium is reduced to colloidal size and dispersed in the benzene.

The resulting colloidal dispersion of metallic indium in benzene, or other colloidal dispersion of metallic indium produced in any suitable manner, is incorporated in a lubricant, such, for example, as a lubricating oil of petroleum origin having a viscosity at 100° F. of the order of 60 seconds Saybolt Universal. A sufficient amount of the dispersion should be added to the oil to establish about 1/20 to 3 parts by weight of metallic indium in 100 parts by weight of oil. The amount of benzene or other vehicle in which the colloidal indium is dispersed should be sufficiently small so as to avoid diluting the lubricant undesirably. The oil containing the colloidal indium is then employed in the crank case of an internal combustion engine, or in other apparatus requiring lubrication. During normal operation of the apparatus some of the colloidal indium deposits on the non-ferrous bearing surfaces and other parts requiring protection against corrosion, as described above.

EXAMPLE C

Indium-containing fuel for internal combustion engines

Indium trimethyl prepared in any suitable manner is dissolved in a fuel, such, for example, as a commercial gasoline. The amount of indium trimethyl dissolved in the gasoline should be of the order of about 1/20 to 2 parts by weight of the indium compound per 100 parts by weight of the gasoline or other fuel. The resulting fuel is employed in the conventional manner to operate an internal combustion engine.

Upon ignition of the fuel in the cylinder of an internal combustion engine, the indium compound is decomposed with the liberation of metallic indium. The metallic indium thus liberated in part deposits on non-ferrous surfaces within a cylinder of the engine. If the cylinder is tin-coated, a portion of the indium will deposit on the cylinder walls and diffuse into the tin coating, thereby enhancing resistance of the cylinder walls to corrosion. A portion of the indium will also appear ultimately on the skirt of the piston, if a non-ferrous piston, such, for example, as an aluminum alloy piston, is employed. The indium deposited on the piston skirt increases the resistance to corrosion of this part of the mechanism. The presence of the indium compound in the fuel also may enhance somewhat the ability of the fuel to withstand premature combustion or deterioration, thus making it more suitable for use in high-compression engines.

In place of employing a gasoline as the base of an indium-bearing fuel, it is understood that other fuels for internal combustion engines such as fuel oils for use in Diesel engines may be employed in accordance with the invention by incorporation therein of a small amount of the indium compound. Other volatile indium compounds such as indium triethyl may be employed in place of the indium trimethyl specifically referred to above, and in the case of fuels intended to be injected directly into an engine cylinder, as is commonly done in Diesel engines, non-volatile indium compounds or colloidal metallic indium may sometimes be employed with advantage.

EXAMPLE D

Lubricating oil containing indium compound for inhibiting sludge formation

Indium phenyl stearate is prepared in any suitable manner. This compound may be prepared, for example, by reacting indium chloride with sodium phenyl stearate in water solution. Methods for preparing sodium phenyl stearate are well known. The indium phenyl stearate precipitates from the aqueous solution of the sodium compound upon addition of the water soluble indium chloride thereto. The indium phenyl stearate is decanted from the solution and is washed and dried. The dried indium phenyl stearate is dissolved in a lubricant, such for example, as a petroleum oil having a viscosity at 100° F. of the order of 60 seconds Saybolt Universal. Preferably about 0.5 to 3 parts by weight of the indium phenyl stearate are incorporated in 100 parts by weight of the oil.

The resulting lubricant is used in the usual manner in internal combustion engines. The indium phenyl stearate very materially increases the resistance of the oil to formation of sludges and other objectionable contaminants when subjected to elevated temperatures and pressures such as are imposed upon the lubricant in service in internal combustion engines, particularly Diesel engines, and in other forms of mechanical apparatus.

Indium phenyl stearate is a relatively stable compound and decomposes but little when oil containing it is used in such apparatus. Such decomposition as does occur with the liberation of metallic indium is not objectionable, as the liberated indium deposits on the bearing or other nonferrous surfaces lubricated without affecting them adversely from a mechanical standpoint, and at the same time improving their resistance to corrosion.

In place of the indium phenyl stearate referred to specifically above, other indium aromatic stearates such as indium tolyl stearate, indium xylyl stearate, indium naphthyl stearate, and the like may be similarly prepared and employed in oils of a similar character to that described above, or in other lubricating media such as vegetable oils and lubricating greases.

EXAMPLE E

*Lubricating oil containing basic indium compound*

Indium hydroxide is incorporated in a lubricating oil, such, for example, as a petroleum lubricating oil having a viscosity of the order of 60 seconds Saybolt Universal at 100 F. Indium hydroxide is readily obtained in the form of a very finely divided gelatinous precipitate which may be dispersed in the oil by adding it thereto and stirring vigorously. Although the indium hydroxide tends to settle from the oil if allowed to stand, the agitation of the oil during use thereof in an engine or other apparatus is sufficient to keep it in suspension. Only a small amount of the order of 1 to 3 parts by weight of indium hydroxide per 100 parts by weight of the oil need be employed.

The indium hydroxide in the oil reacts with any acids formed in the oil by oxidation, thus resulting in an oil which even though it may oxidize will not corrode metallic surfaces. The indium organic compounds formed by reaction of the indium hydroxide with the organic acids produced by oxidation of the oil are of value in that they constitute indium organic compounds which, if decomposed, may liberate metallic indium. The metallic indium will deposit on non-ferrous bearing and other surfaces subject to corrosion and increase their resistance to deterioration resulting from corrosion.

I claim:

1. In the operation of apparatus including relatively moving substantially contacting surfaces at least one of which is non-ferrous and capable of diffusing indium therein, the improvement which comprises applying to said surfaces during operation of said apparatus a fluid containing a substance adapted to deposit metallic indium on said non-ferrous surface under the conditions of operation.

2. In the operation of apparatus including relatively moving substantially contacting surfaces, at least one of which surfaces is non-ferrous, the improvement which comprises introducing between said surfaces a lubricant containing a substance adapted to provide metallic indium in said lubricant under conditions existing between said moving surfaces during their operation, and operating said apparatus under such conditions that the lubricant is introduced between the relatively moving surfaces and metallic indium is caused to deposit on the non-ferrous surface.

3. The method of applying a protective coating of indium to a surface relatively to which another surface moves substantially in contact therewith, at least one of said surfaces being non-ferrous, which comprises lubricating said surfaces with a lubricant containing a substance adapted to provide metallic indium in said lubricant under conditions existing between said moving surfaces during their operation, and causing said relative movement of said surfaces while so lubricating, whereby metallic indium is deposited from said lubricant onto the non-ferrous of said surfaces.

4. A lubricant comprising a lubricating oil and containing a substance comprising indium, said substance being such that the lubricant under conditions of use will contain metallic indium.

5. A lubricant as defined in claim 4 wherein the substance comprising indium is a basic indium compound adapted to neutralize organic acids.

6. A lubricant comprising a lubricating oil and containing an unstable compound of indium capable of decomposing under the influence of heat and pressure with the liberation of metallic indium.

7. A lubricant comprising a lubricating oil and containing indium trimethyl.

8. In the operation of an internal combustion engine including a piston mounted within a cylinder and moving relatively thereto, the improvement which comprises feeding to said engine a liquid fuel comprising a substance adapted to deposit metallic indium, and operating said engine with said fuel in such manner as to cause deposition of metallic indium on the cylinder wall.

9. A lubricant comprising a lubricating oil and containing an indium-bearing substance capable of inhibiting formation in said oil of sludges and products which are corrosive to metallic surfaces, said substance being such that the lubricant under conditions of use will contain metallic indium.

10. A lubricant comprising a lubricating oil and containing an indium aromatic stearate.

11. A refined petroleum product for use in contact with working parts of an internal combustion engine, containing a substance selected from the group consisting of indium trimethyl and indium aromatic stearates.

12. The method of applying a protective coating of indium to a surface which comprises flowing over said surface a fluid containing metallic indium suspended therein and at the same time mechanically working said surface through said film over a substantial period of time, whereby to deposit said metallic indium onto said surface, spread it over said surface and to effect substantial diffusion inward from said surface.

13. A fuel for an internal combustion engine comprising a combustible liquid and an unstable compound of indium adapted, when under influence of heat and pressure, to break down and deposit metallic indium.

14. A lubricating fuel for an internal combustion engine comprising a combustible liquid containing indium trimethyl.

WILLIAM S. MURRAY.